United States Patent
Tamai et al.

(10) Patent No.: US 7,465,250 B2
(45) Date of Patent: Dec. 16, 2008

(54) ON-BOARD HYBRID TRANSMISSION AUXILIARY-PUMP PRIMING CONTROL SYSTEM

(75) Inventors: Goro Tamai, West Bloomfield, MI (US); William L. Aldrich, III, Davisburg, MI (US); Mark A. Zerbini, Canton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 288 days.

(21) Appl. No.: 11/372,921

(22) Filed: Mar. 10, 2006

(65) Prior Publication Data

US 2007/0213174 A1    Sep. 13, 2007

(51) Int. Cl.
*B60K 1/02*    (2006.01)
(52) U.S. Cl. .......................................................... 477/3
(58) Field of Classification Search ..................... 477/3; 180/65.7; 903/948
See application file for complete search history.

(56) References Cited

U.S. PATENT DOCUMENTS

| | | | |
|---|---|---|---|
| 6,319,172 B1 | 11/2001 | Steinmetz et al. | |
| 6,478,705 B1 | 11/2002 | Holmes et al. | |
| 6,527,672 B1 | 3/2003 | Henneken et al. | |
| 6,689,017 B2 | 2/2004 | Ishiguro et al. | |
| 6,692,402 B2 * | 2/2004 | Nakamori et al. | 477/3 |
| 6,709,362 B2 * | 3/2004 | Tomohiro et al. | 477/3 |
| 7,056,260 B2 * | 6/2006 | Nakamori et al. | 477/3 |
| 7,137,924 B2 * | 11/2006 | Ito et al. | 477/3 |
| 7,314,425 B2 * | 1/2008 | Ito et al. | 477/5 |
| 2002/0091034 A1 | 7/2002 | Nakamori | |

FOREIGN PATENT DOCUMENTS

DE    101 62 973 A 1    1/2002

OTHER PUBLICATIONS

Tamai, Goro, et al; Saturn Engine Stop-Start System with Automatic Transmission, 2001, pp. 1-11, 2001-01-0326, Society of Automotive Engineers, Warrendale, PA, USA.

\* cited by examiner

*Primary Examiner*—Dirk Wright (57) ABSTRACT

A method and article of manufacture is provided to control an automatic transmission which includes a hydraulic fluid circuit having an electrically-driven auxiliary hydraulic pressure pump. It includes determining the internal combustion engine is shut off during vehicle operation, and monitoring fluidic pressure at a plurality of locations in the hydraulic circuit. Operation of the electrically-driven auxiliary hydraulic pressure pump is commanded to an elevated voltage level when the engine is shut off and the fluidic pressures fail to register substantially proper pressure levels. It includes discontinuing operation of the electrically-driven auxiliary hydraulic pressure pump when the engine is subsequently commanded on, or when an elapsed measure of time has passed, or when the monitored fluidic pressures register substantially proper pressure levels.

20 Claims, 4 Drawing Sheets

ON-BOARD HYBRID TRANSMISSION AUXILIARY-PUMP PRIMING CONTROL SYSTEM

TECHNICAL FIELD

This invention pertains generally to vehicle transmissions, and more specifically to controlling an auxiliary hydraulic fluid pump of a vehicle transmission.

BACKGROUND OF THE INVENTION

Designers of hybrid vehicle systems are able to shut down operation of an internal combustion engine during vehicle stops to improve fuel economy. When the vehicle employs a conventional hydraulic automatic transmission, an electrically-driven auxiliary hydraulic pressure pump can be implemented to provide hydraulic pressure to a forward clutch pack during periods when the internal combustion engine is shutdown. Maintaining transmission pressure ensures that during subsequent operation of the vehicle, the forward clutch is engaged, to provide a smooth launch similar to that found with a conventional vehicle.

Figure 1:
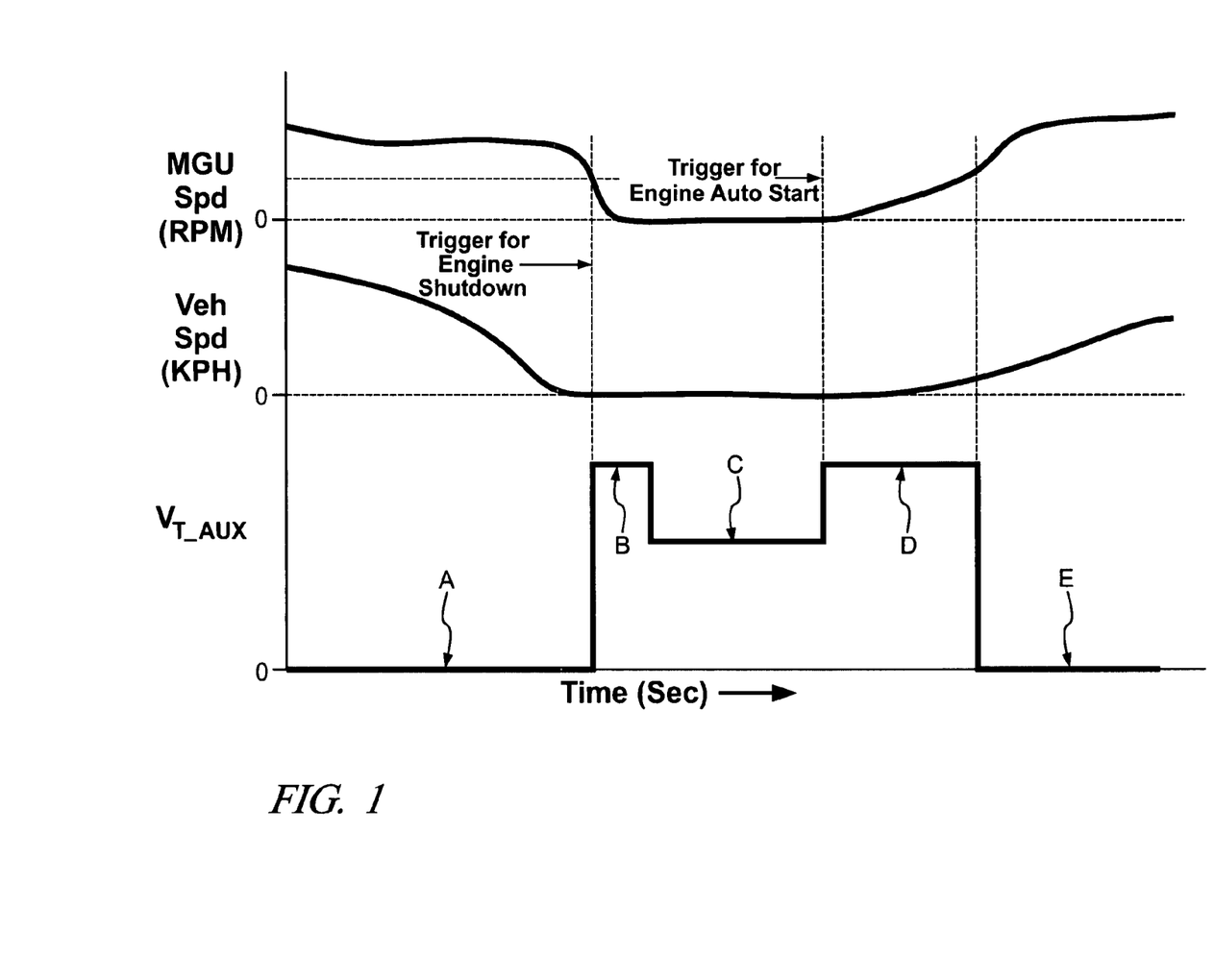
FIG. 1 is a datagraph.

Referring now to FIG. 1, a graphical representation of exemplary operation of a vehicle during an engine shutdown event is shown, including operation of a motor/generator unit ('MGU'), vehicle speed ('Veh Spd') and voltage supplied to the transmission auxiliary pump ('$V_{T\_AUX}$'), each shown as a function of time. During ongoing vehicle operation with the engine operating, voltage supplied to the transmission auxiliary pump or $V_{T\_AUX}$, is 0.0 V, as shown at the portion of the $V_{T\_AUX}$ line labeled as A. When the internal combustion engine is shutdown, voltage to the electrically-driven auxiliary hydraulic pressure pump is boosted, e.g. to 12.0V, to boost hydraulic pressure and minimize pressure dips during a transition from a time at which hydraulic pressure to transmission clutches is provided by a mechanically-driven pump in the transmission until the hydraulic pressure is provided by the electrically-driven auxiliary hydraulic pressure pump. This is shown at the portion of the $V_{T\_AUX}$ line labeled as B. During engine-off, auxiliary pump voltage, and hence hydraulic pressure, is maintained at a steady value (e.g. 9.0V) to balance clutch pressure, energy consumption, and pump durability, as shown at the portion of the $V_{T\_AUX}$ line labeled as C. Upon a command to restart the internal combustion engine, the electrically-driven auxiliary hydraulic pressure pump is again boosted until a calibratable engine speed ('RPM') is reached, as shown at the portion of the $V_{T\_AUX}$ line labeled as D. Once stable engine operation is reached, or after a calibrated delay, voltage supplied to the transmission auxiliary pump or $V_{T\_AUX}$, is 0.0 V, as shown at the portion of the $V_{T\_AUX}$ line labeled as E.

In one vehicle application, once in the engine is off there can be delay timers implemented which delay a command to restart the engine after occurrence of an event. These delays can include the following events. When the operator shifts the gear selector ('PRNDIL' for Park-Reverse-Neutral-Drive-Intermediate-Low) to Park or Neutral, the internal combustion engine is commanded ON after a delay time in the range of four seconds. When the operator shifts to Reverse gear, the internal combustion engine is commanded ON after a transitional delay time of about a half-second (0.5 seconds). When the operator shifts to Intermediate or Low gear, the internal combustion engine is commanded ON after a delay time of about one second. When the PRNDIL is shifted back to Drive while the internal combustion engine is in an OFF state, the internal combustion engine is commanded ON after a delay time of about 0.05 seconds. These timers are referred to as the PRNDIL-based Restart timers.

The electrically-driven auxiliary hydraulic pressure pump may not have a prime, i.e. there may not be sufficient hydraulic fluid in the pump and hydraulic circuit to permit proper operation, when the internal combustion engine is commanded on after having been turned off during operation. When the auxiliary pump is unprimed, hydraulic pressure is not generated in the transmission when the pump is subsequently operated. The auxiliary pump can lose its prime due to air entrainment when the vehicle is stopped for a long duration or stopped on a large incline, when there is incomplete servicing of the plumbing of the auxiliary pump, when there is a pin leak in the auxiliary pump plumbing, and for other causes.

In some vehicle applications, hydraulic pressure is monitored, and loss of pressure due to a loss of prime in the auxiliary pump can be interpreted by the hybrid control system as the gear selector, or PRNDIL, being shifted into Park/Neutral or Intermediate/Low, and then to an undesired state, or, more directly, the gear selector being in an undesired state. An undesired state is registered when hydraulic pressure signature is not representative of any normal operation. In the undesired state, a fault code can be set, or the internal combustion engine is commanded ON immediately. When the gear selector is interpreted as being shifted into Park/Neutral or Intermediate/Low, and then to an undesired state, the internal combustion engine can be commanded ON when the operator does not expect it.

In any event, it is desirable for the hybrid control system to re-prime the auxiliary pump system, to provide reliable, predictable, and consistent engine stop-start behavior to avoid customer dissatisfaction and reduce warranty costs.

Therefore, a method and system are offered which address the above-stated concerns.

SUMMARY OF THE INVENTION

A method and an article of manufacture are provided that are operable to effect a method to control an automatic transmission operably connected to an internal combustion engine of a vehicle. The automatic transmission includes a hydraulic fluid circuit having an electrically-driven auxiliary hydraulic pressure pump. The method includes determining the internal combustion engine is shut off, and monitoring fluidic pressure at a plurality of locations in the hydraulic circuit. Operation of the electrically-driven auxiliary hydraulic pressure pump is commanded to an elevated voltage level, i.e. boosted, when the internal combustion engine is shut off and the monitored fluidic pressures fail to register substantially proper pressure levels.

An aspect of the invention includes discontinuing the boosted voltage operation of the electrically-driven auxiliary hydraulic pressure pump when the internal combustion engine is subsequently commanded on, or when an elapsed measure of time has passed, or when the monitored fluidic pressures register substantially proper pressure levels.

Another aspect of the invention includes monitoring fluidic pressure at a reverse gear circuit location, a drive, intermediate or low gear circuit location, and a park, reverse, neutral or drive gear circuit location.

Another aspect of the invention includes discontinuing boosted voltage operation of the electrically-driven auxiliary hydraulic pressure pump when the monitored fluidic pressure at the reverse gear circuit location is less than a first threshold pressure level, and the monitored fluidic pressures at the drive, intermediate or low gear circuit location and the park, reverse, neutral or drive gear circuit location are each greater than a second threshold pressure level.

Another aspect of the invention includes monitoring electrical signal outputs from a plurality of pressure switches operable to monitor fluidic pressures at a plurality of locations in the hydraulic circuit, or, alternatively, monitoring electrical signal outputs from a plurality of pressure sensors operable to monitor fluidic pressures at a plurality of locations in the hydraulic circuit.

Another aspect of the invention includes the hydraulic fluid circuit operable to actuate a torque-transmitting clutch of the automatic transmission when pressurized.

Another aspect of the invention includes a method to maintain fluidic prime of an electrically-driven auxiliary hydraulic pressure pump for a hydraulic fluid circuit of an automatic transmission operably connected to an internal combustion engine.

Another aspect of the invention includes a method to detect a fault in a hydraulic fluid circuit of an automatic transmission operably connected to an internal combustion engine. This includes determining the internal combustion engine is shut off, and monitoring fluidic pressures at a plurality of locations in the hydraulic fluid circuit. Operation of the electrically-driven auxiliary hydraulic pressure pump is commanded to an elevated voltage when the internal combustion engine is shut off and the monitored fluidic pressures fail to register substantially proper pressure levels. Occurrence of a fault is identified when the monitored fluidic pressures fail register substantially proper pressure levels after the commanded boosted voltage operation of the electrically-driven auxiliary hydraulic pressure pump.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 2:
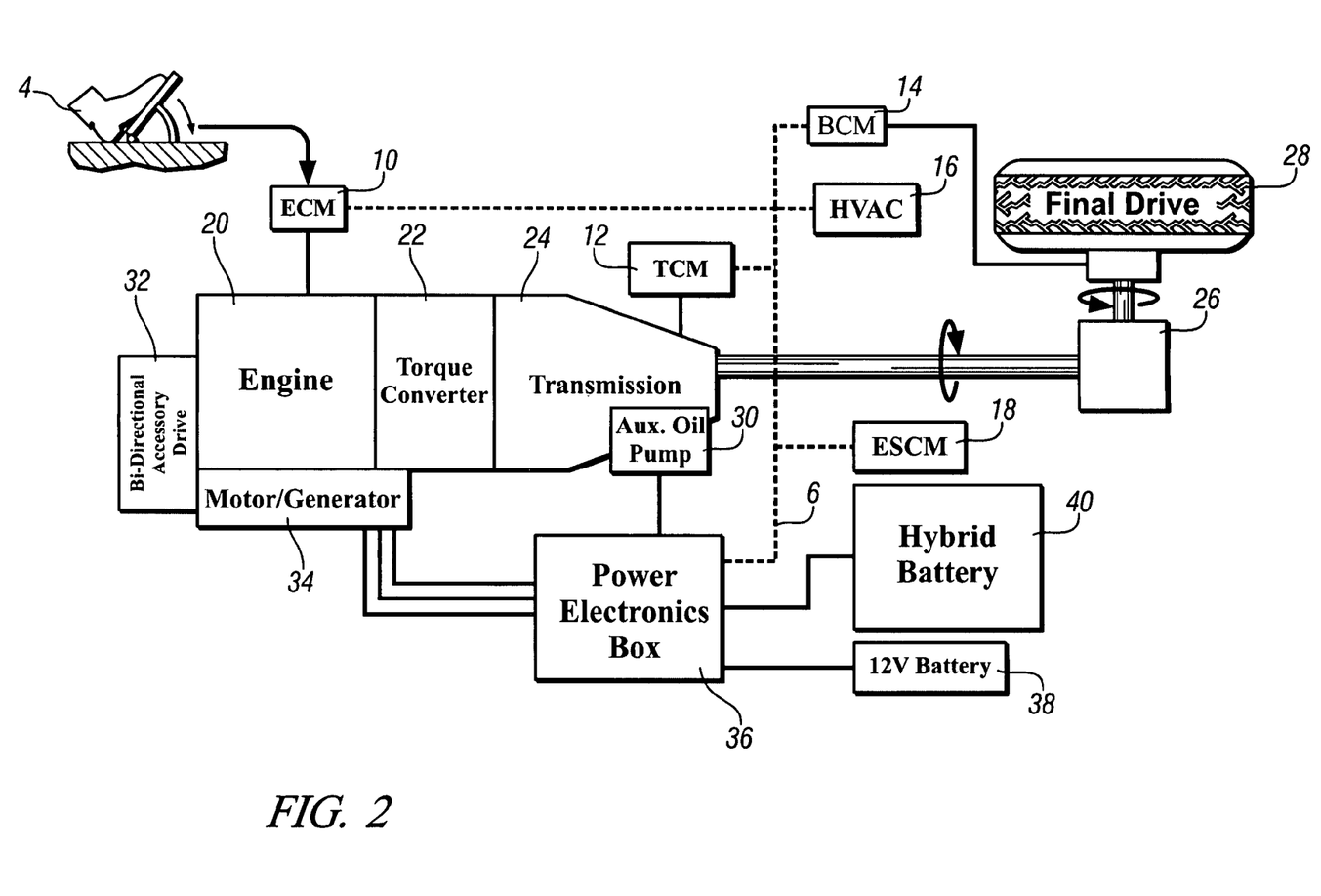
FIG. 2 is a schematic diagram of an engine and control system, in accordance with the present invention.

Referring now to the drawings, wherein the showings are for the purpose of illustrating the invention only and not for the purpose of limiting the same, FIG. 2 shows a schematic drawing of a vehicle propulsion system including an exemplary internal combustion engine and control system which has been constructed in accordance with an embodiment of the present invention. The exemplary system, described as a belt-driven alternator/starter ('BAS') system, comprises a powertrain system having internal combustion engine 20, a transmission 24, a motor-generator unit 34, and a Power Electronics Box ('PEB') 36, each signally and/or operably connected to a distributed control system via a local area network (LAN) bus 6. The distributed control system comprises an engine control module (ECM) 10, a transmission control module (TCM) 12, a brake control module (BCM) 14, an energy storage control module (ESCM) 18, and a heating-ventilation-air conditioning controller (HVAC) 16, among others.

The powertrain system includes the internal combustion engine 20 operable to provide tractive power to drive wheels 28 using known power transmission devices including a torque converter 22, transmission 24, and a vehicle driveline 26, typically comprising a transaxle for a front wheel drive vehicle, or, alternatively, a rear differential unit for a rear wheel drive vehicle, or other known devices for delivering power to vehicle wheels. Alternatively, the vehicle is operable to transmit kinetic energy to the vehicle driven wheels 28, through vehicle driveline 26 to the transmission 24, torque-converter 22, and engine to a bi-directional accessory belt drive system 32 and motor-generator unit 34.

The motor-generator unit ('MGU') 34 comprises an electrical machine operable to act as a torque-generative device and as an electrical-generative device, preferably depending upon vehicle operation and a control signal from the controller 10 to the Power Electronics Box ('PEB') 36, and other control signals. The PEB 36 includes the functions of a Power Inverter Module (PIM) and Auxiliary Power Module (APM) to selectively transmit electrical energy between the MGU 34 and a high-voltage ('HV') battery 40, preferably operating at 36 $V_{DC}$, and a conventional twelve-volt battery 38. The PEB is operable to control operation of an electrically-powered auxiliary oil pump 30 fluidly attached to a hydraulic circuit of the transmission 24 to provide pressurized fluid in the hydraulic circuit during specific operating conditions, including engine shutdown and vehicle shutdown. It is understood that the voltage battery 40 and the conventional twelve-volt battery 38 may comprise any one of various devices operable to provide electrical energy storage capacity on the vehicle.

The internal combustion engine 20 is operably attached to the bi-directional accessory belt drive system 32 intended to operate in a first operating condition, comprising an electrical energy generating mode and in a second operating condition, comprising a torque-generating mode. In the first operating mode, the internal combustion engine 20 provides torque to the accessory belt drive system 32, transferring power and energy to motor-generator unit 34 ('MGU') and other accessories. In the first operation the MGU 34 functions as the electrical energy generative device to replenish or charge the electrical energy storage system comprising the high-voltage ('HV') battery 40 and the twelve-volt battery 38, using torque generated by the engine 20 and/or kinetic energy from the vehicle. In the second operating condition, the MGU 34 functions as an electrical motor to generate torque which is transmitted to the internal combustion engine 20 via the accessory belt drive system 32 to start engine operation, using electrical energy stored in the electrical energy storage system. The MGU 34 may further function as the electrical motor to generate torque that is transmitted to the engine 20 to stabilize engine operation and provide torque damping to the vehicle driveline.

The aforementioned componentry of the exemplary embodiment is known to a skilled practitioner, although it is understood that alternate embodiments using novel componentry may fall within the scope of the invention described herein.

The distributed control system comprising an integrated vehicle control system wherein the controllers, including ECM 10, TCM 12, BCM 14, HVAC 16 are signally connected via LAN 6 to accomplish various tasks. Each of the aforementioned control processors is preferably a general-purpose digital computer generally including a microprocessor or central processing unit, ROM, RAM, and I/O including A/D and D/A. Each control processor includes a set of control algorithms, comprising resident program instructions and calibrations stored in ROM and executed to provide the respective functions. Information transfer between the various control processors is preferably accomplished by way of the aforementioned LAN.

The integrated vehicle control system is signally attached to a plurality of sensing devices and operably connected to a plurality of output devices to ongoingly monitor and control operation of the engine 20, the transmission 24, and the MGU 34 and the PEB 36. This includes monitoring conditions of the HV battery 40, and, determining state of charge of the HV battery 40. The controlled output devices preferably include subsystems for proper control and operation of the engine 20, including, by way of example, an air intake system including a throttle control system, a fuel injection system, a spark-ignition system (when a spark-ignition engine is used), an exhaust gas recirculation system, and an evaporative control system. The sensing devices include devices operable to monitor engine operation, including engine speed, and load, comprising manifold pressure and/or airflow. The system controller 10 is preferably operable to regularly determine an engine operating point based upon the monitored engine operation. Other sensors include those operable to monitor external conditions, and operator demand, and are typically signally attached to the system controller 10 via wiring harnesses. One operator input of significance comprises position of accelerator pedal 4.

Control algorithms in each of the control processors are typically executed during preset loop cycles such that each control algorithm is executed at least once each loop cycle. Algorithms stored in the non-volatile memory devices are executed by the respective central processing unit and are operable to monitor inputs from the sensing devices and execute control and diagnostic routines to control operation of the respective device, using preset calibrations. Loop cycles are typically executed each 3.125, 6.25, 12.5, 25 and 100 milliseconds during engine and vehicle operation. Alternatively, control algorithms may be executed in response to occurrence of an event. A cyclical event, e.g. calculating engine fueling, may be executed each engine cycle. An action to start the engine 20 after it is turned off is preferably executed in response to an event, e.g. an operator demand for acceleration which is detected by monitoring operator input to accelerator pedal 4. Alternatively, the action to start the engine 20 after it is turned off may be a quasi-cyclic event, wherein the powertrain controller 10 cyclically monitors vehicle conditions such ambient air temperature, and implements an engine start event on a subsequent loop cycle in order to provide additional functionality.

The integrated vehicle control system is signally connected to the aforementioned sensors and other sensing devices, and operably connected to output devices to monitor and control engine and vehicle operation. The output devices preferably include subsystems providing for proper control and operation of the vehicle, including the engine, transmission, and brakes. The sensing devices providing signal input to the vehicle include devices operable to monitor vehicle operation, external and ambient conditions, and operator commands.

In overall operation, the ECM sends motor/generators 34 control commands to the PEB 36 in the form to torque, speed, or voltage-control commands, depending on the hybrid function. The PEB broadcasts key control parameters such as motor speed, delivered torque, temperature, and diagnostics. The ESCM 18 monitors key inputs to support hybrid battery (i.e. HV battery 40) state optimization, in addition to supporting automatic fan and disconnect control. The ECM and the TCM interact to coordinate gear-shift and TCC operation to maximize fuel economy and optimize drivability. Each of these control actions are preferably executed while integrating operation of the BCM and the HVAC. Hybrid powertrain operations of the exemplary system preferably include engine start/stop; fuel-cut during vehicle deceleration using the electrical machine 34 to provide smoothing of driveline torque; control of battery charge/discharge; regenerative braking; electrical power assist; and, electrically motored creep.

The exemplary transmission preferably comprises a known automatic transmission having a plurality of gear ratios typically providing transmission input/output speed ratios ranging from about 3.0/1 to 0.74/1. The transmission control processor preferably includes control algorithms and predetermined calibrations useable to control ongoing operation of the transmission 24, preferably in coordination with other control processors. The transmission calibration preferably includes a predetermined gear shifting pattern which controls gear shifting within the transmission based upon operator torque requests comprising inputs to the accelerator pedal, engine operating speed, and vehicle speed. One such shifting pattern comprises an up-shift, wherein the controller commands the transmission to shift from a lower gear ratio to a higher gear ratio based upon a change in the aforementioned inputs.

Figure 3:
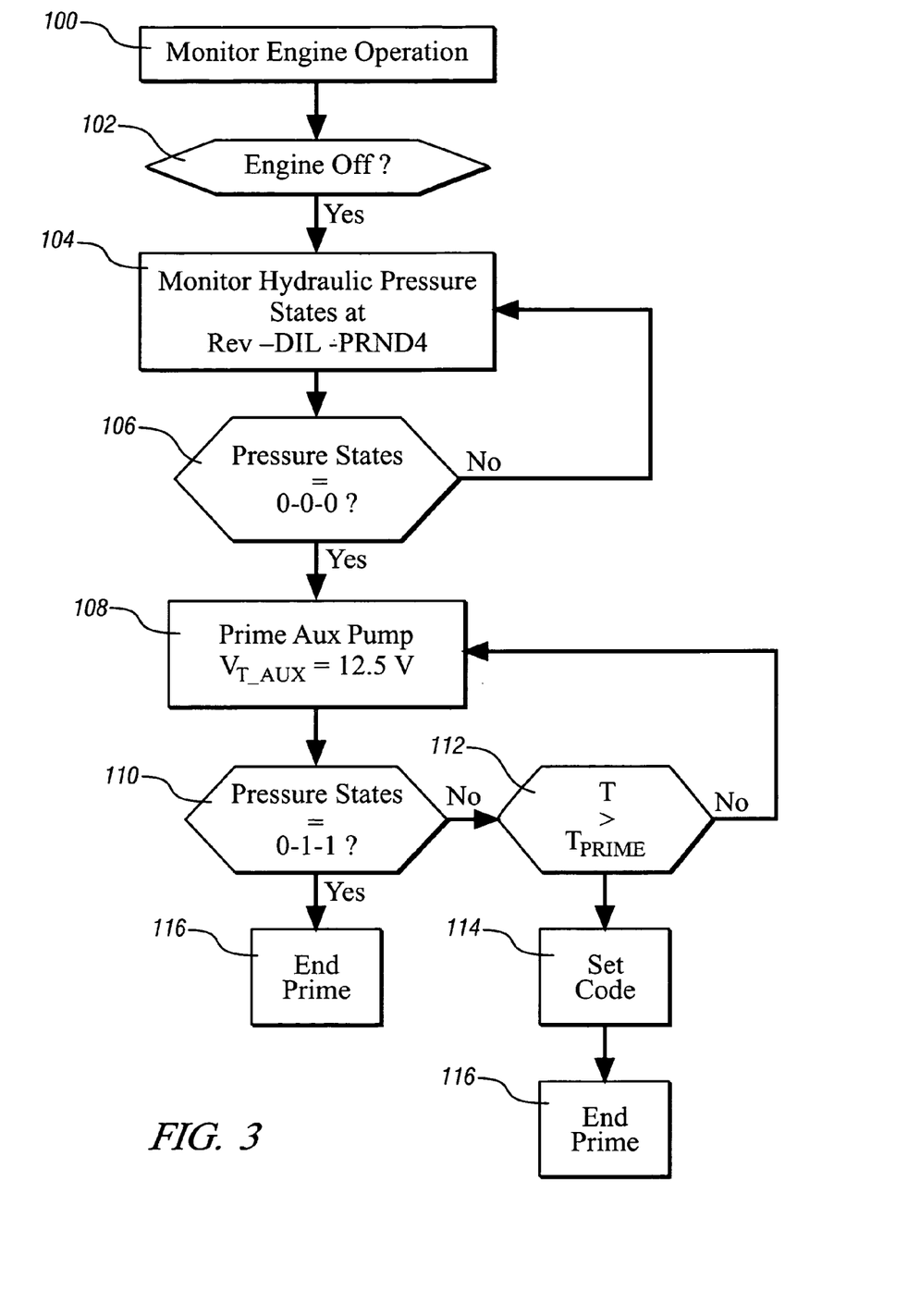
FIG. 3 is an algorithmic flowchart, in accordance with the present invention; and, FIG. 4 is an exemplary datagraph, in accordance with the present invention.

Referring now to FIG. 3, the invention described hereinafter includes a method, executed as one or more algorithms that are preferably stored in one of the control modules, to control the automatic transmission 24 in the system shown with reference to FIG. 2. The automatic transmission includes a hydraulic fluid circuit having an electrically-driven auxiliary hydraulic pressure pump 30. The method includes monitoring operation of the internal combustion engine (block 100) to determine that the engine is shut off (block 102), monitoring fluidic pressure at a plurality of locations in the hydraulic circuit (block 104, 106), and commanding operation of the electrically-driven auxiliary hydraulic pressure pump to prime the pump 30 when the internal combustion engine is shut off and the monitored fluidic pressures fail to register substantially proper pressure levels (block 108). Specific actions may occur during the priming event. This operation is now described in detail.

The transmission 24 includes a hydraulic fluid circuit including a mechanically-driven hydraulic fluid pump (not shown) and the electrically-driven auxiliary hydraulic pressure pump 30, each which are operable to provide sufficient amounts of hydraulic fluid to the hydraulic circuit to operate the transmission 24 through actuating a torque-transmitting clutch (not shown) contained therein. The hydraulic circuit includes a plurality of pressure switches used in conjunction with an operator-controlled gear selector. The operator-controlled gear selector enables the operator to select one of the following gears: Park-Reverse-Neutral-Drive-Intermediate-Low, also referred to as 'PRNDIL'. In this embodiment, there preferably is a first pressure switch associated with and actuated by Reverse ('REV') gear, a second pressure switch associated with and actuated by Drive, Intermediate and Low ('DIL') gears, and a third pressure switch associated with and actuated by the Park, Rev, Neutral and Drive ('PRND4') gears (not shown). The three pressure switches are located in the hydraulic fluid circuit at specific locations and are operable to monitor hydraulic fluid pressure in the circuit at the specific locations. Each pressure switch is a known device which operates in a manner wherein when the hydraulic pressure exceeds a threshold value, the switch output is HIGH, or "1", and when the hydraulic pressure is less than the threshold, the switch output is LOW, or "0". Alternatively, the specific locations in the hydraulic circuit may be monitored with pressure sensors having linear signal outputs which correspond to magnitude of hydraulic pressure.

In the embodiment, an operating state of the transmission is determined with reference to Table 1, below, which is preferably executed as a lookup table in the transmission control module (TCM) 12.

TABLE 1

| PRNDIL State | REV Switch | DIL Switch | PRND4 Switch |
|---|---|---|---|
| Park | 0 | 0 | 1 |
| Reverse | 1 | 0 | 1 |
| Neutral | 0 | 0 | 1 |
| Drive | 0 | 1 | 1 |
| Intermediate | 0 | 1 | 0 |
| Low | 0 | 1 | 0 |
| Undesired 1 | 0 | 0 | 0 |
| Undesired 2 | 1 | 0 | 0 |
| Undesired 3 | 1 | 1 | 0 |
| Undesired 4 | 1 | 1 | 1 |

A command to shut down the internal combustion engine is preferably executed only when the PRNDIL switch states indicate the gear selector is in Drive, i.e. 0-1-1. When the auxiliary pump system has lost hydraulic fluid prime, the state can degrade from 0-1-1 to 0-1-0 (i.e., Intermediate or Low) or 0-0-1 (i.e., Park or Neutral), and further to 0-0-0 (i.e., unprimed, or Undesired 1). For an unprimed system, the time to reach 0-0-0 is typically less than 1 second (e.g., 250 milliseconds, or msec).

During any transition period to the unprimed state, 0-0-0, the control system freezes the PRNDIL state to suspend PRNDIL-based restart timers (described hereinbelow) of hybrid control system. Once the unprimed, 0-0-0, state is recognized (block 106), the onboard prime system, described herein, is actuated by the control system (block 108).

When the onboard prime system is actuated, hydraulic pressure builds in the system, with the state changing from the unprimed ('0-0-0') state to pressure states represented as 0-0-1 or 0-1-0, i.e. a race condition, and subsequently to drive state 0-1-1 (block 110), which comprises substantially proper pressure levels for the system as described herein. Again, when the first transition from 0-0-0 is registered, the PRNDIL state is frozen for about 250 milliseconds to suspend the PRNDIL-based restart timers.

The on-board auxiliary-pump priming control system is now explained. During the engine-off event, when the proper transmission pressure signature is not registered, delay timers for engine-on are suspended for some time $T_{SUSP}$. The delay timers for engine-on are referred to as the PRNDIL-based restart timers, and preferably include the following actions: when the operator shifts the gear selector ('PRNDIL' for Park-Reverse-Neutral-Drive-Intermediate-Low) to Park or Neutral, the internal combustion engine is commanded ON after a delay time in the range of four seconds; when the operator shifts to Reverse gear, the internal combustion engine is commanded ON after a transitional delay time of about a half-second (0.5 seconds); when the operator shifts to Intermediate or Low gear, the internal combustion engine is commanded ON after a delay time of about one second; and, when the PRNDIL is shifted back to Drive while the internal combustion engine is in an OFF state, the internal combustion engine is commanded ON after a delay time of about 0.05 seconds.

During suspended time, $T_{SUSP}$, (typically in the range of 300 msec), the transmission pressure may drop to a "no-pressure" state that is indicative of a loss of auxiliary pump operation, i.e., prime loss. When the no-pressure state is registered (i.e. 0-0-0), on-board priming (OBP) control is initiated (block 108). If the no-pressure state is not registered, the delay timers are re-enabled, and normal engine and vehicle operation is resumed.

When the on-board prime control is initiated, the auxiliary pump boost phase is extended for some calibrated time, $T_{PRIME}$, (e.g. 15 seconds). The auxiliary pump boost phase preferably comprises an action by the control system to cause the PEB 36 to operate the auxiliary oil pump 30, $V_{T\_AUX}$, at about 12.5V (block 108).

The on-board prime control is terminated (block 116) under the following conditions:
 a. Proper pressure signature is registered (block 110);
 b. Timer $T_{PRIME}$ expires (block 112); or,
 c. The engine is commanded on, such as when the operator releases brake pedal or the battery state of charge is too low.

When a proper pressure state is not registered during the time period $T_{PRIME}$ a fault code can be set (block 114). When the $T_{PRIME}$ expires (e.g. sitting at a stop light for a duration of time), the control system indicates that the auxiliary pump system can not be primed, and a true mechanical problem exists. In such a case, the fault code is stored, and appropriate OBD actions are executed.

Figure 4:
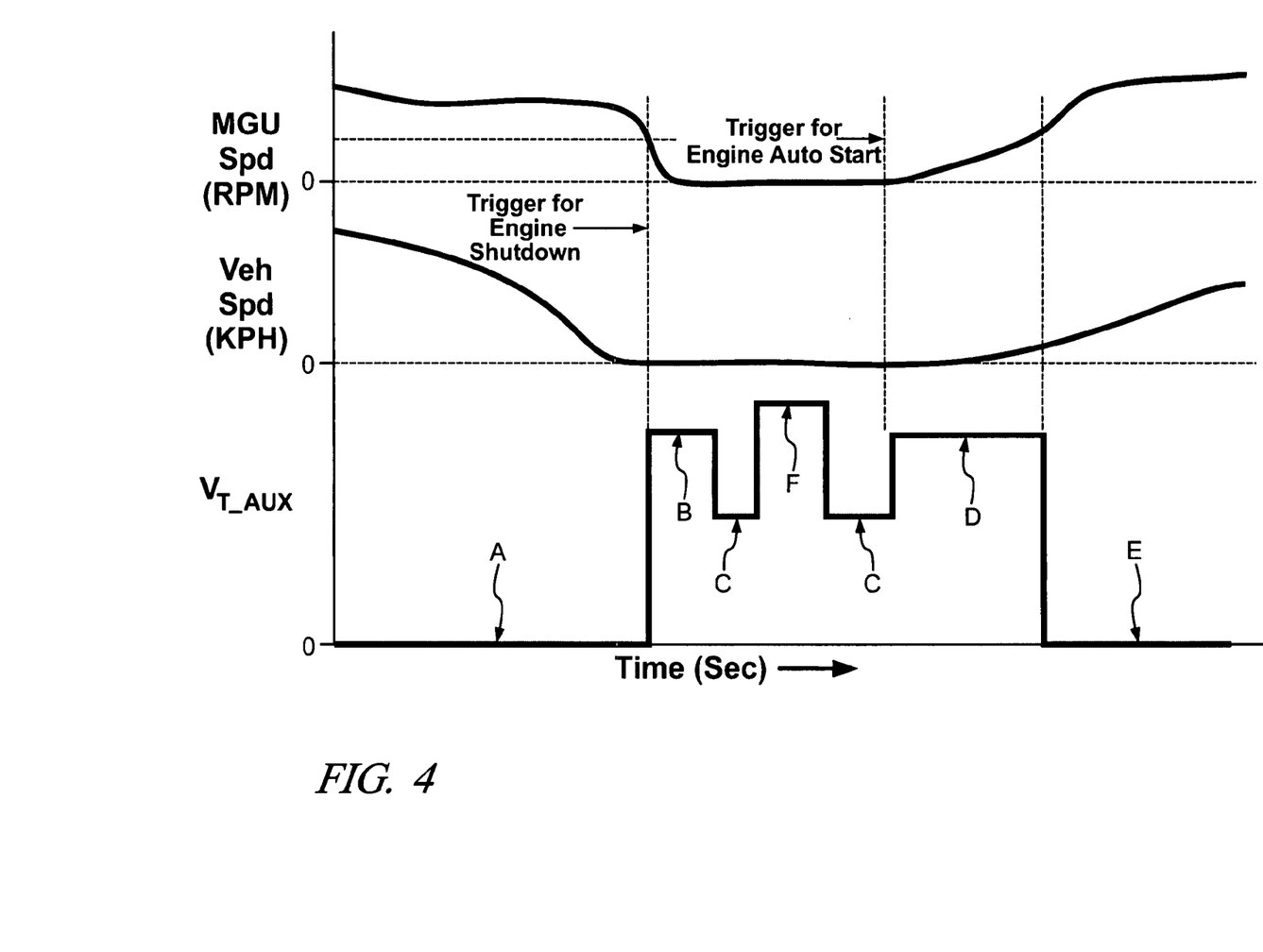

Referring now to FIG. 4, a graphical representation of exemplary operation of a vehicle during an engine shutdown event in accordance with the invention described with reference to FIG. 3 is shown. This includes a showing of operation of the motor/generator unit ('MGU'), vehicle speed ('Veh Spd') and voltage supplied to the transmission auxiliary pump ('$V_{T\_AUX}$'), each as a function of time. During ongoing vehicle operation with the engine operating, voltage supplied to the transmission auxiliary pump or $V_{T\_AUX}$, is 0.0 V, as shown at the portion of the $V_{T\_AUX}$ line labeled as A. When the internal combustion engine is shutdown, voltage to the electrically-driven auxiliary hydraulic pressure pump is initially boosted, e.g. to 12.0V, to boost hydraulic pressure and minimize pressure dips during a transition from a time at which hydraulic pressure to transmission clutches is provided by a mechanically-driven pump in the transmission until the hydraulic pressure is provided by the electrically-driven auxiliary hydraulic pressure pump. This is shown at the portion of the $V_{T\_AUX}$ line labeled as B. Subsequently, during the engine-off period, hydraulic pressure is maintained at a steady value (e.g. 9.0V) to balance clutch pressure, energy consumption, and pump durability, as shown at the portion of the $V_{T\_AUX}$ line labeled as C. At some time during the engine shutdown, it is determined that the pressure states are allowed to drop to a "no-pressure" state, i.e. 0-0-0. When this state is reached, voltage to the electrically-driven auxiliary hydraulic pressure pump is commanded to an elevated voltage level or boosted, e.g. to 12.5 V, which is shown at the portion of the $V_{T\_AUX}$ line labeled as F. The pump is operated at the elevated voltage level for a time, and then operation is discontinued based upon conditions described hereinabove. Operation of the pump is returned to steady state voltage levels, as shown with regard to the portion of the $V_{T\_AUX}$ line labeled as C'. Upon a command to restart the internal combustion engine, the electrically-driven auxiliary hydraulic pressure pump is again boosted until a calibratable engine speed ('RPM') is reached, as shown at the portion of the $V_{T\_AUX}$ line labeled as D. Once stable engine operation is reached, or after a calibrated delay, voltage supplied to the transmission auxiliary pump or $V_{T\_AUX}$ is 0.0 V, as shown at the portion of the $V_{T\_AUX}$ line labeled as E.

Although this is described in context of a vehicle having a BAS hybrid system, it is understood that alternate embodiments of this invention can include other vehicle systems having hybrid and non-hybrid configurations, and fixed gear transmissions. This includes vehicle systems operable to translate vehicle kinetic energy to electrical energy potential.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Article of manufacture, comprising a storage medium having a computer program encoded therein for effecting a method to control an automatic transmission operably connected to an internal combustion engine of a vehicle, the automatic transmission comprising a gear selector and a hydraulic fluid circuit having an electrically-driven auxiliary hydraulic pressure pump, the program comprising:
   code for determining the internal combustion engine is shut off;
   code for monitoring fluidic pressure at a plurality of locations in the hydraulic circuit whereby different combinations of the monitored fluidic pressures are indicative of gear selector positions;
   code for suspending engine restarts based on the monitored fluidic pressure; and
   code for commanding operation of the electrically-driven auxiliary hydraulic pressure pump to an elevated voltage level when the internal combustion engine is shut off and at least one of the monitored fluidic pressures fail to register substantially proper pressure levels.

2. The article of manufacture of claim 1, wherein the program further comprises:
   code for discontinuing operation of the electrically-driven auxiliary hydraulic pressure pump at the elevated voltage level when the internal combustion engine is commanded on.

3. The article of manufacture of claim 1, wherein the program further comprises:
   code for discontinuing the elevated voltage operation of the electrically-driven auxiliary hydraulic pressure pump after a predetermined duration of operation.

4. The article of manufacture of claim 1, wherein the program further comprises:
   code for discontinuing operation of the electrically-driven auxiliary hydraulic pressure pump at the elevated voltage level when the monitored fluidic pressures register substantially proper pressure levels.

5. Article of manufacture, comprising a storage medium having a computer program encoded therein for effecting a method to control an automatic transmission operably connected to an internal combustion engine of a vehicle, the automatic transmission comprising a hydraulic fluid circuit having an electrically-driven auxiliary hydraulic pressure pump, the program comprising:
   code for determining the internal combustion engine is shut off, wherein the code for determining the internal combustion engine is shut off further comprises code for determining the internal combustion engine is shut off from a running state during ongoing vehicle operation;
   code for monitoring fluidic pressure at a plurality of locations in the hydraulic circuit; and
   code for commanding operation of the electrically-driven auxiliary hydraulic pressure pump to an elevated voltage level when the internal combustion engine is shut off and at least one of the monitored fluidic pressures fail to register substantially proper pressure levels.

6. Article of manufacture, comprising a storage medium having a computer program encoded therein for effecting a method to control an automatic transmission operably connected to an internal combustion engine of a vehicle, the automatic transmission comprising a hydraulic fluid circuit having an electrically-driven auxiliary hydraulic pressure pump, the program comprising:
   code for determining the internal combustion engine is shut off;
   code for monitoring fluidic pressure at a plurality of locations in the hydraulic circuit,
      wherein the code for monitoring fluidic pressure at a plurality of locations in the hydraulic circuit comprises code for monitoring fluidic pressure at a reverse gear circuit location, a DIL gear circuit location, and a PRND4 gear circuit location; and
   code for commanding operation of the electrically-driven auxiliary hydraulic pressure pump to an elevated voltage level when the internal combustion engine is shut off and at least one of the monitored fluidic pressure fail to register substantially proper pressure levels.

7. The article of manufacture of claim 6, wherein the code for commanding operation of the electrically-driven auxiliary hydraulic pressure pump at the elevated voltage level when the internal combustion engine is shut off and the monitored fluidic pressures fail to register substantially proper pressure levels further comprises:
   code for discontinuing operation of the electrically-driven auxiliary hydraulic pressure pump at the elevated voltage level when the monitored fluidic pressure at the reverse gear circuit location is less than a first threshold pressure level, and the monitored fluidic pressures at the DIL gear circuit location and the PRND4 gear circuit location are each greater than respective second threshold pressure levels.

8. The article of manufacture of claim 1, wherein the code for monitoring fluidic pressure at a plurality of locations in the hydraulic circuit further comprises code for monitoring electrical signal outputs from a plurality of pressure switches operable to monitor fluidic pressures at a plurality of locations in the hydraulic circuit.

9. The article of manufacture of claim 1, wherein the code for monitoring fluidic pressure at a plurality of locations in the hydraulic circuit further comprises code for monitoring electrical signal outputs from a plurality of pressure sensors operable to monitor fluidic pressures at a plurality of locations in the hydraulic circuit.

10. The article of manufacture of claim 1, wherein the hydraulic fluid circuit is operable to actuate a torque-transmitting clutch of the automatic transmission when pressurized.

11. Method to control an automatic transmission operably connected to an internal combustion engine of a vehicle, the automatic transmission comprising a gear selector and a hydraulic fluid circuit having an electrically-driven auxiliary hydraulic pressure pump, comprising:
   determining the internal combustion engine is shut off;
   monitoring fluidic pressures at a plurality of locations in the hydraulic circuit whereby different combinations of the monitored fluidic pressures are indicative of gear selector positions;

suspending engine restarts based on fluidic pressure indicated gear selector position; and commanding operation of the electrically-driven auxiliary hydraulic pressure pump at an elevated voltage level when the internal combustion engine is shut off and at least one of the monitored fluidic pressures fails to register substantially proper pressure levels.

12. The method of claim 11, further comprising:

discontinuing operation of the electrically-driven auxiliary hydraulic pressure pump at the elevated voltage level when the internal combustion engine is commanded on.

13. The method of claim 11, further comprising:

discontinuing operation of the electrically-driven auxiliary hydraulic pressure pump at the elevated voltage level after a predetermined duration of operation.

14. The method of claim 11, further comprising:

discontinuing operation of the electrically-driven auxiliary hydraulic pressure pump at the elevated voltage level when the monitored fluidic pressures register substantially proper pressure levels.

15. The method of claim 11, wherein monitoring fluidic pressures at a plurality of locations in the hydraulic circuit further comprises monitoring electrical signal outputs from a plurality of pressure switches operable to monitor pressures at a plurality of locations in the hydraulic circuit.

16. The method of claim 11, wherein monitoring fluidic pressures at a plurality of locations in the hydraulic circuit further comprises monitoring electrical signal outputs from a plurality of pressure sensors operable to monitor pressures at a plurality of locations in the hydraulic circuit.

17. Method to maintain fluidic prime of an electrically-driven auxiliary hydraulic pressure pump for a hydraulic fluid circuit of an automatic transmission including a gear selector and operably connected to an internal combustion engine, comprising:

determining the internal combustion engine is shut off;

monitoring fluidic pressures at a plurality of locations in the hydraulic fluid circuit whereby different combinations of the monitored fluidic pressures are indicative of gear selector positions;

suspending engine restarts based on the fluidic pressure indicated gear selector position; and commanding operation of the electrically-driven auxiliary hydraulic pressure pump to an elevated voltage level when the internal combustion engine is shut off and at least one of the monitored fluidic pressures fail to register substantially proper pressure levels.

18. Method to maintain fluidic prime of an electrically-driven auxiliary hydraulic pressure pump for a hydraulic fluid circuit of an automatic transmission operably connected to an internal combustion engine, comprising:

determining the internal combustion engine is shut off, wherein determining the internal combustion engine is shut off further comprises determining the internal combustion engine is shut off from a running state during ongoing vehicle operation;

monitoring fluidic pressures at a plurality of locations in the hydraulic fluid circuit; and commanding operation of the electrically-driven auxiliary hydraulic pressure pump to an elevated voltage level when the internal combusion engine is shut of and at least one of the monitored fluidic pressures fail to register substantially proper pressure levels.

19. Method to detect a fault in a hydraulic fluid circuit of an automatic transmission operably connected to an internal combustion engine, comprising:

determining the internal combustion engine is shut off;

monitoring fluidic pressures at a plurality of locations in the hydraulic fluid circuit;

commanding operation of the electrically-driven auxiliary hydraulic pressure pump to an elevated voltage level when the internal combustion engine is shut off and at least one of the monitored fluidic pressures fails to register substantially proper pressure levels; and, identifying occurrence of a fault when at least one of the monitored fluidic pressures fails register substantially proper pressure levels after the commanded operation of the electrically-driven auxiliary hydraulic pressure pump at the elevated voltage level.

20. The method of claim 19, wherein determining at least one of the monitored fluidic pressures fail to register substantially proper pressure levels comprises:

monitoring fluidic pressures at a reverse gear circuit location, a DIL gear circuit location, and a PRND4 gear circuit location; and, determining at least one of the fluidic pressures at the reverse gear circuit location is greater than a first threshold pressure level, the monitored fluidic pressure at the DIL gear circuit location is less than a second threshold pressure level, and, the monitored fluidic pressure at the PRND4 gear circuit location is less than the second threshold pressure level.

* * * * *